INVENTOR.
Francis E. Edwards, Jr

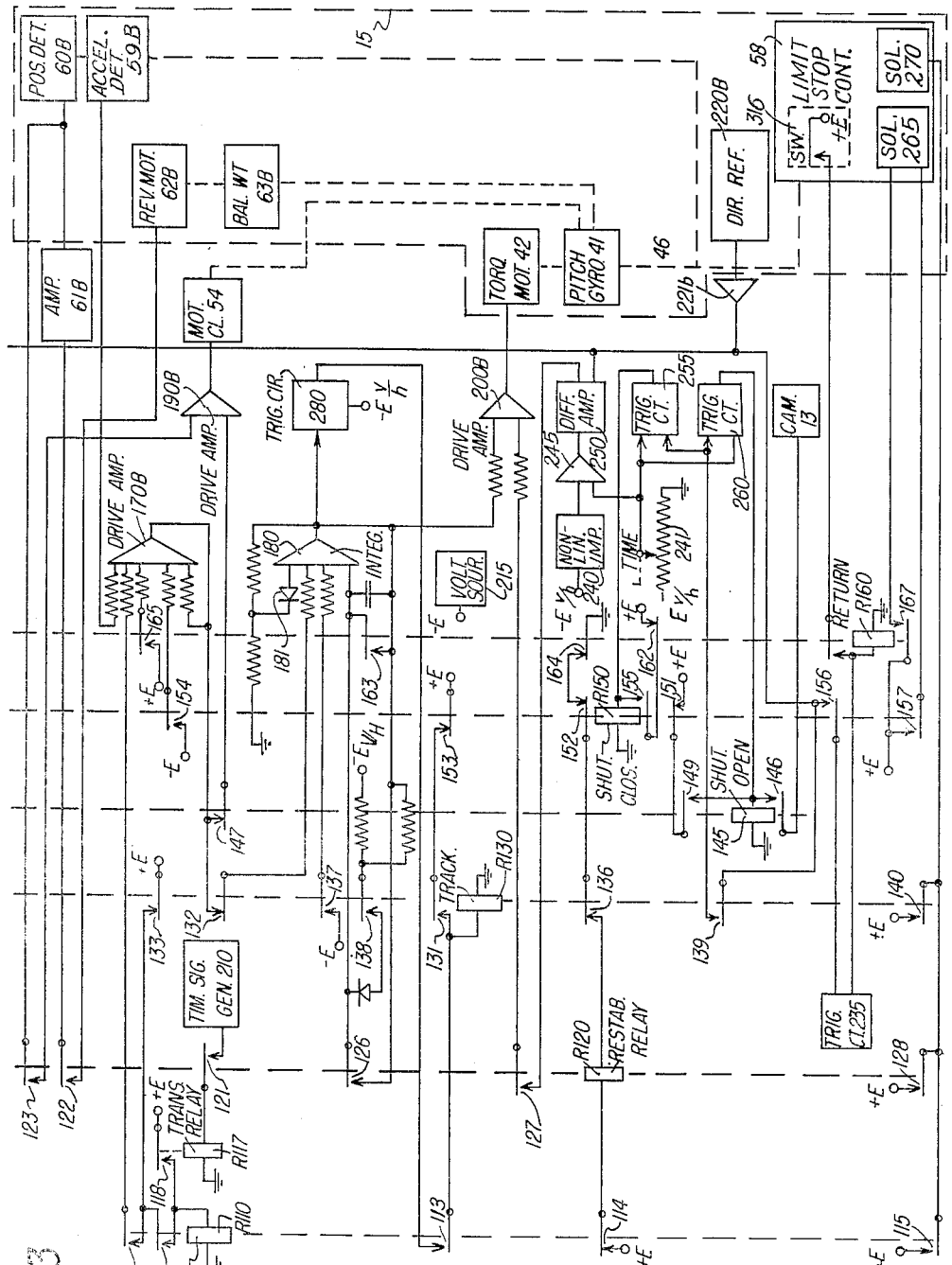

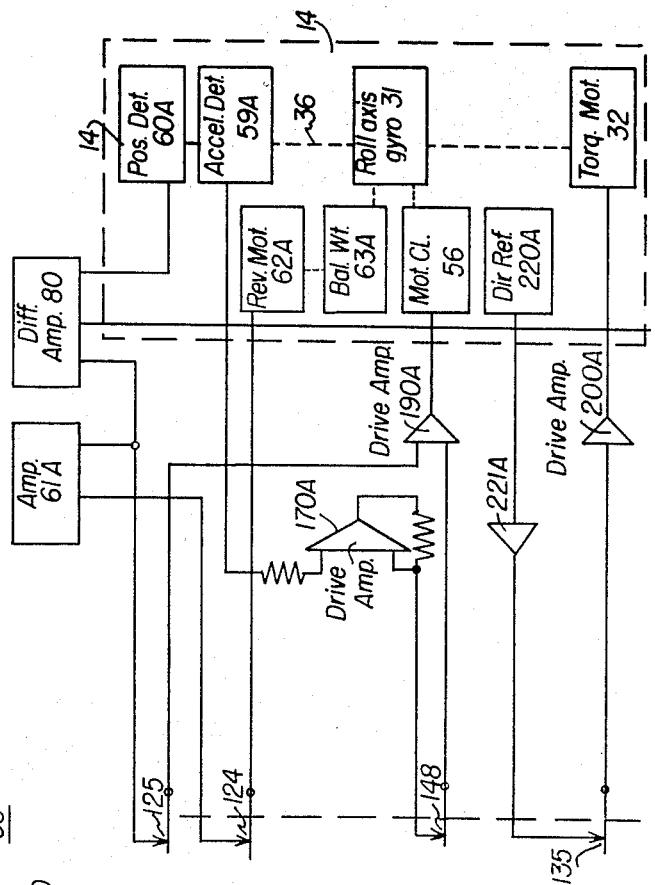
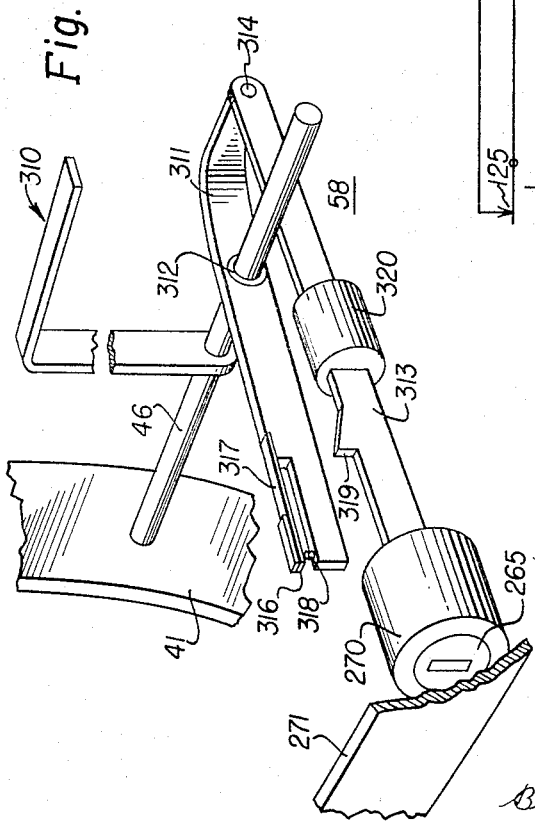
Fig. 4
Fig. 5

Nov. 29, 1960     F. E. EDWARDS, JR     2,961,877
STABILIZED ANGULAR RATE MOUNT
Filed Jan. 30, 1959     4 Sheets-Sheet 4

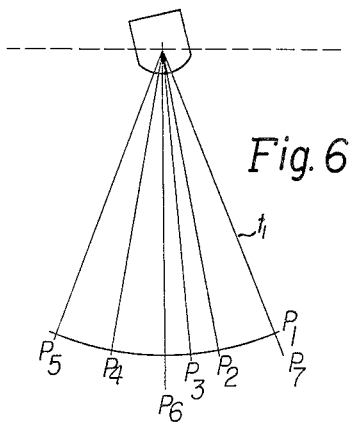

Fig. 6

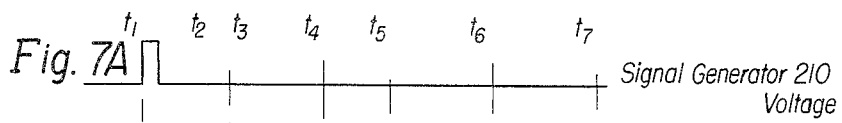

Fig. 7A — Signal Generator 210 Voltage

Fig. 7B — Amplifier 190B Voltage

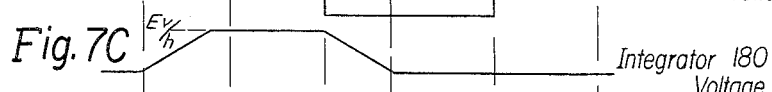

Fig. 7C — Integrator 180 Voltage

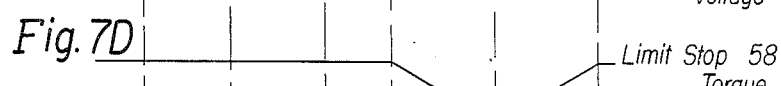

Fig. 7D — Limit Stop 58 Torque

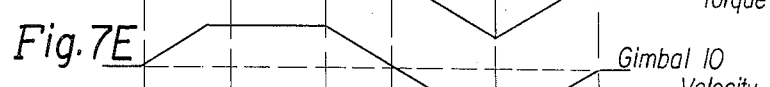

Fig. 7E — Gimbal 10 Velocity

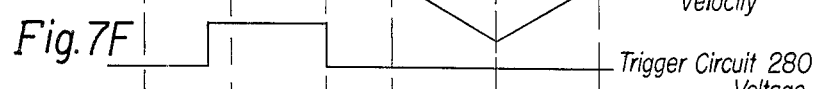

Fig. 7F — Trigger Circuit 280 Voltage

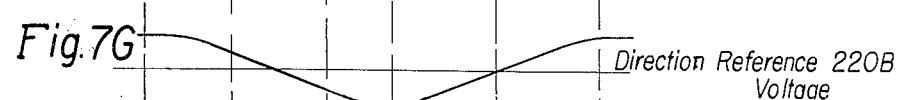

Fig. 7G — Direction Reference 220B Voltage

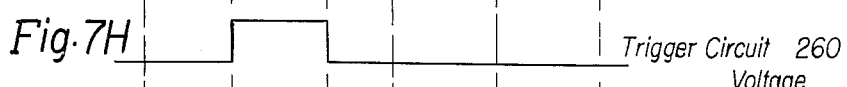

Fig. 7H — Trigger Circuit 260 Voltage

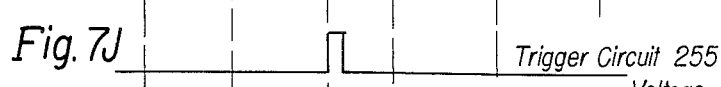

Fig. 7J — Trigger Circuit 255 Voltage

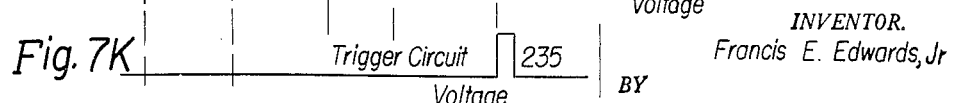

Fig. 7K — Trigger Circuit 235 Voltage

INVENTOR.
Francis E. Edwards, Jr
BY
Attys.

United States Patent Office 2,961,877
Patented Nov. 29, 1960

2,961,877

STABILIZED ANGULAR RATE MOUNT

Francis E. Edwards, Jr., Des Plaines, Ill., assignor, by mesne assignments, to Chicago Aerial Industries, Inc., Melrose Park, Ill., a corporation of Delaware Filed Jan. 30, 1959, Ser. No. 790,213

18 Claims. (Cl. 74—5.22)

The present invention relates to aerial photographic equipment and specifically to apparatus and methods for both stabilizing the camera platform and for providing photographic image-motion-compensation.

In aerial photography, the motion of the camera, and specifically the motion of the sensitized film therein, relative to the image of the ground objects being recorded, creates a considerable problem as to picture clarity and detail. The problem derives from the circumstance that the platform for the aerial camera is mounted in a moving aircraft and is subject, with the aircraft, to forces and influences which cause movements between the photographic image and the sensitized film. For convenience of reference these undesirable movements can be characterized as "platform disturbances."

One kind of platform disturbance is the random type caused by erratic aircraft movements in a turbulent air mass and by mechanical operations of the camera itself including opening and closing of the shutter, transport of film, and so forth. Another kind of platform disturbance is of a directed type caused by the planned movement of the aircraft in its flight path.

The ultimate object of any image-motion-compensation system is to maintain the camera platform and the film-image surface carried thereon stable with reference to the image being photographically recorded. In such a system, the platform must be compensated for both the random type and the directed type of platform disturbance.

The random type platform disturbance can be compensated for by providing the platform with gyroscopic equipment to establish an aribitrary frame of reference, with sensing devices for detecting any deviations in the platform from the reference frame, and with servo-mechanisms for counteracting the detected random platform disturbances. Though complicated, such arrangements have been utilized with success for the stated purposes.

The directed type of platform disturbance is somewhat more easy to compensate for inasmuch as it can be predicted from knowledge of both the aircraft's ground speed and altitude. In one compensation arrangement, a computer and an associated platform drive system can be employed for rotating the platform so as to cause the camera platform to track the photographic target and thereby compensate for the directed disturbance. In this arrangement, the camera platform is cycled through an arcuate path during each photographic interval in order to compensate for the angular speed of the camera relative to a fixed point on the ground.

If these two arrangements could be used conjunctively, it would be possible to achieve idealized image-motion compensation. However, these arrangements have not heretofore been compatible because, in existing mechanisms, for every correction that the computer platform drive system might attempt to apply to the camera platform for purposes of cycling the platform, the gyroscopic apparatus and the servo mechanism would tend to counteract for purposes of maintaining the platform stabilized to the arbitrary frame of reference.

It is a general object of the present invention to provide a compatible control system for an aerial camera platform capable of effecting both platform stabilization and platform oscillation.

It is a further object of the invention to provide a control system for aerial photographic equipment which stabilizes the platform against random platform disturbances and also compensates the platform for directed platform disturbances.

An additional object of the invention is to provide improved apparatus for stabilizing an aerial camera platform relative to a reference frame in space.

An additional object of the invention is to provide improved apparatus for moving the camera platform in order to track the photographic target and thereby compensate for flight motion of the photographic film.

A further object of the invention is to provide a control arrangement for effecting compatible operation between the apparatus for stabilizing the camera platform to a reference frame in space and the apparatus for compensating for the flight motion of the photographic film during the photographic interval.

Further objects and features of the invention pertain to the particular structure and arrangements whereby the above objects are attained.

The structure in accordance with the invention includes a camera platform which is carried on gimbals in an azimuth ring for movement at least about the roll axis and the pitch axis of the aircraft. Gyroscopic equipment is provided on the platform for establishing a reference plane relative to the pitch and roll axes and for providing precessing torques in response to deviations in the platform position from the reference plane. The roll axis gimbal and the pitch axis gimbal is each provided with a balance-weight arrangement and a fast-response motor-clutch, the former of which is active for neutralizing any continuing torques that might be active upon the gimbal and the latter of which may be made operative for neutralizing transistory torques operative on the gimbal. Each gyroscopic apparatus has associated therewith a sensing device which measures both the amount and the rate of change of gyroscopic precession and feeds such information to a control circuit which distributes proper signals to the balance-weight arrangement and the fast-response motor-clutch for stabilizing the platform in the reference plane. In association with the camera platform, there is also provided computer equipment which is the recipient of information relative to aircraft altitude and speed, to photographic interval and to exposure interval. This computer functions during each photographic cycle to selectively deactivate the pitch axis balance-weight arrangement and to provide signals to the pitch axis motor-clutch unit and a pitch axis torque motor for driving the platform in a controlled cyclic movement.

The invention, both as to its structure and mode of operation, will be better understood by reference to the following disclosure and drawings, forming a part thereof, wherein.

Figures 3 and 4 present a schematic diagram of the control circuit employed in the camera platform arrangement in accordance with the invention;

Figure 5 is a perspective illustration of a limit stop control employed in the arrangement of the invention;

Figure 6 is a time-position diagram of the arc through which the camera traverses during each photographic interval; and Figures 7A to 7H and 7J, 7K represent the time sequence of signals and torques which operate during a photographic cycle.

Figure 1:
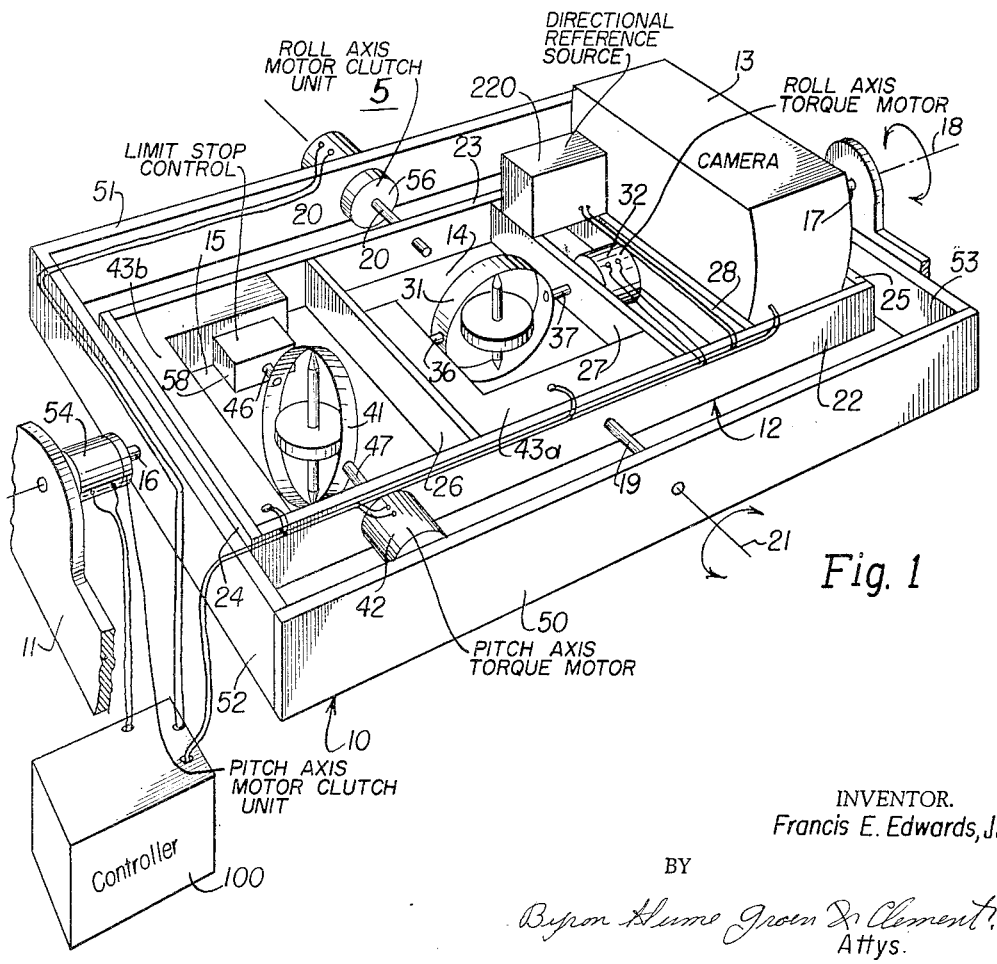
Figure 1 is a schematic representation in perspective of the camera platform arrangement in accordance with the present invention.

Referring to the drawings, there is shown in Figure 1 a camera platform arrangement 5 in accordance with the invention including an outer or pitch axis gimbal ring 10 pivotally supported from an azimuth ring 11 associated with the frame of the aircraft, and an inner or roll axis gimbal ring 12 pivotally supported within the outer gimbal ring 10. A servo drive, not shown, responding to drift signals from a suitable source, such as the aircraft navigational system, rotates azimuth ring 11 so as to maintain the pitch axis normal to the path of ground motion. Supported on the inner gimbal ring 12 is an aerial camera 13, a roll axis gyro arrangement 14, and a pitch axis gyro arrangement 15. A controller 100 is provided for purposes of operating the camera 13 and controlling movement of the camera platform at the outer gimbal ring 10 and the inner gimbal ring 12.

The outer gimbal ring 10, which in this instance has been chosen to be, but is not necessarily, rectangular in shape, is made up of two parallel pairs of joined gimbal members 50 and 51, and 52 and 53 and is pivotally supported at the gimbal members 52 and 53 by a pair of trunnions 16 and 17 journaled in bearings at the azimuth ring 11. The axis of the trunnions 16 and 17 may be either coaxial with or parallel to the pitch axis 18 of the aircraft and for purposes of convenience in describing the system, the axis of the trunnions 16 and 17 is considered to be coaxial with the pitch axis 18.

The inner gimbal ring 12 has been chosen to be, but is not necessarily, rectangular in shape and is made up of two parallel pairs of joined gimbal members 22 and 23, and 24 and 25, divided into sections by crossmembers 26, 27 and 28 lying parallel to the members 24 and 25. The gimbal ring 12 is pivotally supported at the parallel members 22 and 23 by means of trunnions 19 and 20 journaled in bearings at the outer gimbal ring 10. The axis of the trunnions 19 and 20 may be either coaxial with or parallel to the roll axis 21 of the aircraft and for purposes of convenience in describing the system, the axis of trunnions 19 and 20 is considered to be coaxial with the roll axis 21.

The roll axis gyro arrangement 14 is made up of a high torque gyroscope 31 supported in the pivot axis of gimbal 12 by means of shafts 36 and 37 between the crossmembers 26 and 27. Connected to the shaft 37 is a torque motor 32 for applying precessional torques to the gyroscope 31. A roll axis servo-housing 43A running along the crossmember 26 and between the crossmembers 26 and 27 receives the other shaft 36 of the gyroscope 31 by means of which gyro motion is detected and utilized for purposes of gyro control. The nature of the roll axis servo-housing and its equipment will be more fully described hereinafter.

Considering the pitch axis gyro arrangement 15, there is included therein a high torque gyroscope 41 supported between the members 22 and 23 of the inner gimbal ring 12 by means of shafts 46 and 47. The shaft 47 has joined thereto at its end a torque motor 42 for delivering precessional torques to the gyroscope 41. The other shaft 46 carries thereon a limit stop control 58 and is received in a pitch axis servo mechanism housing 43B. The pitch axis servo mechanism 43B is identical to the roll axis servo mechanism 43A.

A motor-clutch unit 54 driven from the controller 100 is mounted to the azimuth ring 11 in association with the shaft 16 for purposes of applying to the shaft 16 and the associated outer gimbal ring 10 forces tending to rotate the gimbal ring about the pitch axis 18. Additionally, a motor-clutch unit 56 driven from the controller 100, is carried on the outer gimbal ring 10 in association with the shaft 20 for purposes of applying to the inner gimbal ring 12 forces tending to rotate that gimbal ring about the roll axis 21. In certain instances the motor clutch unit 56 may be dispensed with depending upon the efficiency of the bearings for the trunnions 19 and 20. The torques impressed by motor-clutch 54 and 56 may be transmitted by means other than as shown.

Figure 2:
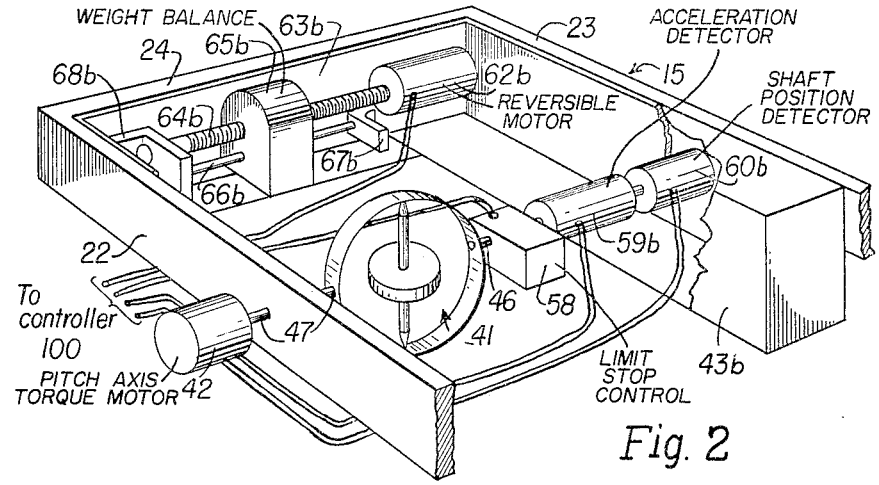
Figure 2 is a schematic representation in greater detail of the portion of the arrangement shown in Figure 1 associated with the pitch axis.

The servo-mechanism 43A associated with the roll axis gyro arrangement 14 and the servo-mechanism 43B associated with the pitch axis gyro arrangement 15 are considered in detail hereinafter with reference to the pitch axis gyro arrangement 15 as shown in Figure 2. The servo-mechanism includes an acceleration detector 59B which is responsive to the time-rate of change of shaft motion, a shaft position detector 60B, a reversible drive electric motor 62B and a weight-balance arrangement 63B. The weight-balance arrangement 63B includes a screw shaft 64B connected directly to the armature of the reversible motor 62B and journaled at its other end in a bracket 68B. The screw shaft 64B carries thereon a threaded balance weight 65B which also slides on a rod 66B parallel to the screw shaft 64B and secured at one end in the bracket 68B and secured at the other end in a bracket 67B.

For purposes of easier understanding of the invention, it is advantageous to provide at this time a functional description of the mode in which the components thus far identified operate. Specifically, consider that the aircraft is airborne and in a normal flight position, and that the gyros 31 and 41 are spinning and uncaged, the gyros then establish an artificial reference plane with reference to the pitch axis and the roll axis of the aircraft and it is to this reference plane that the platform 5 is normally stabilized. Assuming, for example, that thereafter the aircraft is caught in a down draft that pitches the aircraft about the pitch axis, the gyro 41 and the gimbal 10 are subjected to corresponding forces. It is assumed that the platform is not influenced about the roll axis. The gyro 41 will tend to precess about the axis formed by the shafts 46 and 47, which precession will be detected by the acceleration detector 59B and the shaft position detector 60B. The shaft position detector 60B detects the magnitude and the direction of change and acts to cause the motor clutch 54 and the reversible motor 62B to drive in a direction to depreciate the precessing forces. At the same time the acceleration detector 59B detects the rate of change of shaft movement and this information is utilized as an input to the motor-clutch 54 to provide damping torques.

Assuming that the disturbing forces on the gimbal 10 are continuing, as would be true in the exampled case, the position detector continues to operate the reversible motor 62B thereby to drive the weight-balance 65B to a position tending to neutralize the disturbing forces. In this fashion the gimbal 10 is maintained in the reference plane and the platform 5 is stabilized about the pitch axis. The balance weight system 63B and the motor clutch unit 54 through the position detector 60B lend control and power to the stabilization arrangement whereas the motor-clutch unit 54 through the acceleration detector lend sensitivity and high response to the stabilization arrangement.

What has been stated above with reference to the gimbal 10 and disturbing forces about the pitch axis can also be applied to the gimbal 12 and disturbing forces about the roll axis, inasmuch as the gimbal 12 is provided with equivalent control equipment.

Assuming stabilization of the platform 5 about a reference plane in a manner as described above, during each photographic cycle the motor-clutch unit 54 and the torque motor 42 are selectively activated to drive the outer gimbal 10 about the pitch axis so that the camera will track the ground objects during the actual period that the shutter is opened. These control functions are achieved through use of the controller 100 which is considered hereinafter.

As shown in Figures 3 and 4, the controller 100 is made up of a plurality of relays including a platform start relay R110, a transfer relay R117, a platform restabilization relay R120, a platform tracking relay R130, a shutter open relay R145, a shutter closed relay R150 and a platform return relay R160. Additionally, the controller 100 includes component control units for the roll axis gyro arrangement 14 and the pitch axis gyro arrangement 15 wherein the former includes a differential amplifier 80, drive amplifiers 61A, 170A, 190A and 200A, and wherein the latter includes drive amplifiers 61B and 170B, an integrator 180, and drive amplifiers 190B and 200B. Additionally, there are included in the controller 100 amplifiers 221A, 221B and 245, trigger circuits 235, 255, 260 and 280, a nonlinear network 240, and a differential amplifier 250, all utilized for controlling and triggering the other units within the controller.

Connected to the controller 100 but not necessarily physically included therewith is a timing signal generator 210, a speed-and-altitude voltage source 215, and a directional reference source 220. The timing generator 210 might be a simple switch operated manually for purposes of providing a pulse to operate the system through an image-motion compensation cycle or it might be an intervalometer, such as is disclosed in the patent application to Willits, Mohan and McCarty, Serial No. 649,078, filed on March 28, 1957, and assigned to the assignor of the present application, capable of providing a chain of cycle initiating pulses. The specific arrangement employed is not critical to the present invention, it being important only that there is a source of cycle initiating pulses.

The speed-and-altitude voltage source 215 provides an output voltage that is proportioned to the ground speed $v$ of the aircraft divided by the terrain clearance $h$ of the aircraft. The arrangement of the speed-and-altitude voltage source may be in accordance with the disclosure in United States Patent No. 2,413,349, issued on December 31, 1946, to Hancock and Meinema.

Directional reference source 220 may be unitary but for purposes of easier explanation herein will be considered to be made up of two units, 220A and 220B, providing voltage indicative of the amount and of the direction of inclination of the gimbal ring 10 and of the gimbal ring 12, respectively, relative to the frame of reference. The outputs from the units 220A and 220B are amplified, through amplifiers 221A and 221B, respectively.

In practice the unitary directional reference source 220 may take the form of a vertical-seeking gyroscope mounted on the gimbal ring 12 and arranged with suitable output devices for providing output voltages corresponding to those of two units 220A and 220B.

Further, in the system trigger circuits of any suitable type such, for example, as Schmitt triggers, are employed for developing signals responsive to voltage inputs of given polarities and magnitudes. Specifically, trigger circuits 235, 255 and 260 operate in a manner as described hereinafter from input voltages supplied by the source 220B, and the trigger circuit 280 operates from an input voltage supplied at the output of the integrator 180.

To aid in returning the platform to its start position, there is included, in addition to the other equipment already mentioned, a limit stop control 58 which is effective for applying mechanical torque directly to the pitch axis gyro arrangement 41. As shown in Figure 5, the limit stop control 58 includes an arm 310 secured as by pinning to the shaft 46, a lever arm 311 rotatably mounted to shaft 46 by means of a journal box 312, an arm 313 attached to lever 311 by means of a pivot pin 314 and concentric solenoids 265 and 270 suitably mounted to the pitch axis servo housing 43B by means of a bracket 271. In this arrangement, there is also included at the free end of the lever arm 311 a limit switch 316 including a leaf spring contact 317 and a coil spring contact 318. This switch 316 is arranged so that when the lever arm is rotated relative to the arm 310, contact therebetween closes the leaf spring contact 317 against the coil spring contact 318. The solenoid 265 is arranged so that responsive to the energization thereof, the arm 313 is drawn in, thereby causing movement of the lever arm 311 about the shaft 46 so as to move the switch 316 towards the arm 310. The arm 313 is provided with a dashpot 320 and also with a mechanical stop 319 the latter of which is to prevent movement of the switch 316 beyond a predetermined point corresponding with the erect position of gyro 41.

Considering now the operation of the arrangement in accordance with the invention, as previously pointed out, the platform 5 is normally stabilized about a reference plane established by the roll axis gyro arrangement 31 and by the pitch axis gyro arrangement 41. Such stabilization, of course, occurs only during the non-photographic cycle periods. During each photographic cycle, the camera platform 5, and, accordingly, the aerial camera 13 is moved in an arc about the pitch axis 18 which arc may be referred to as the image-motion-compensation path. One such path is shown in Figure 6 where the platform and the camera are moved from a position $P_1$ through positions $P_2$, $P_3$ and $P_4$ to the position $P_5$, in order to provide image-motion-compensation, and from the position $P_5$ in a reverse arc through the position $P_6$ and to the position $P_7$, the latter corresponding to the position $P_1$.

The cycle path illustrated in Figure 6 and described above is chosen merely by way of example, for in another cycle configuration, the camera might start each photographic cycle from the position $P_6$ from whence it would be driven into the start position $P_1$ and thereafter reversibly driven from the position $P_1$ to the position $P_5$ while the film is exposed to the photographic image and at the end of that interval, then reversibly driven from the position $P_5$ back to the start position $P_6$. As to specifically where the start position of the camera platform during each cycle might be, is not important to the present consideration, but it is important that it be understood that the camera and platform are driven through an arcuate path during each photographic interval and it is meant to describe herein the various operations that take place within the arrangement during each photographic interval.

Assume that the camera platform is prepared for a photographic cycle. At the same time, the speed-and-altitude voltage source 215 provides in its output a signal which is proportional to the velocity and altitude of the aircraft. Additionally, the timing signal generator 210 which may take the form of an intervalometer is energized so that it will provide at the proper time a signal for initiating a photographic cycle. During this pre-photographic cycle interval the controller 100 shown in Figures 3 and 4 is further energized and prepared for operation by the completion of a circuit extending from battery potential to the contacts 114, the restabilization relay R120, the contacts 136, 152, and 164 to ground potential. Accordingly, the relay R120 is operated and the contacts 121 to 123 and 126 to 128, inclusive, associated therewith are closed. At the contacts 122 and 123, the position detector 60B associated with the pitch axis arrangement 15 is connected into the controller 100 for purposes of sensing and correcting precessing movements of the pitch axis gyro 41. At the contacts 121, a circuit is prepared for operating the transfer relay R117 in response to the application of a timing signal from the generator 210. At the normally closed contacts 124 and 125 associated with the relay R145, the position detector 60A associated with the roll axis gyro arrangement 14 is connected into the controller 100 for purposes of sensing and correcting precessing movements of the roll axis gyro 31. The occurrence of the signal in the timing signal generator 210 initiates the photographic cycle and corresponds to a time which may be identified as $t_1$ in the photographic cycle.

As pointed out above, prior to the time $t_1$ and the initiation of the photographic cycle, the controller unit is conditioned through operation of relay R120 to stabilize the position of the platform about position $P_1$, that is, the outer gimbal ring 10 and the inner gimbal ring 11 will be stabilized in a plane passing through the pitch axis and oblique to the roll axis.

Operation of the controller unit 100 for purposes of erecting and stabilizing the position of the roll axis gyro unit about position $P_1$ will be understood by reference to Figure 4. Therein there is shown the component units for achieving stabilization of the roll axis gyro arrangement. When the inner gimbal 12 is rotated into the position $P_1$, the gyro 31 will tend to be aligned in the vertical position thereby rendering to the position detector 60A a signal which would normally indicate to the controller 100 that the gyroscope has precessed from its preferred position. Without the provision of any additional control, the controller 100 would tend to operate so as to rotate the gimbal 12 about the roll axis in order to compensate for the signal provided by the position detector 60A.

In order to prevent this happening, the output from the position detector 60A is provided to the differential amplifier 80 and additionally, the differential amplifier 80 is provided with an output signal from the amplifier 221B associated with the direction reference source 220B. As pointed out previously, the direction reference source 220B provides an output signal of a polarity and magnitude indicative of both the direction and amount of inclination of the inner gimbal ring 12 relative to the pitch axis. Thus with the platform in the position $P_1$ the signal output from the amplifier 221B should be equal in polarity and magnitude to that output signal from the position detector 60A so that there is no difference signal occurrent in the differential amplifier 80 and no output is provided therefrom. Accordingly, the error signal from the position detector 60A will be completely compensated and there will be no corresponding operation on the part of the controller 100.

With the platform in the position $P_1$, the gyro 31 is erect and operative for sensing torques applied to the gimbal 12 about the roll axis and responsive to the application of any such torque, the gyro tends to precess in a corresponding direction causing rotation and change in the position of the shaft 36. It is understood that this torque about the roll axis will cause no change in the output of the amplifier 221B associated with the direction reference source 220B. This change in the position of the shaft 36 is detected by the position detector 60A which applies a corresponding change in signal to the differential amplifier 80 which appears in the output thereof and is applied via contacts 125 and the drive amplifier 190A to the motor clutch unit 56 and also through the amplifier 61A and contacts 124 to the reversible motor 62A associated with the balance-weight arrangement 63A.

At the same time, the rate of change of shaft position is sensed by the acceleration detector 59A and is applied to the amplifier unit 170A which includes a feedback arrangement for maintaining the output thereof proportional to the input as is well-known to those versed in the computer art. The output of the amplifier 170A is applied via contacts 148 to the drive amplifier 190A associated with motor-clutch unit 56 to provide damping to the system. Accordingly, responsive to any short term or impulse torques, the motor-clutch unit 56 connected to the pivotal shaft 20 of the gimbal ring 12 is energized so as to introduce compensating torques onto the gimbal ring 12 and the gyro 31 thereby to stabilize the platform against unwanted motions. Sustained torques will cause operation of the reversible motor 62A so as to move the balance-weight 63A to balance and to compensate for the sustained torque on the gimbal ring 12.

As pointed out above, the direction reference source 220A provides an output signal of a polarity and magnitude corresponding to the direction and amount of movement of the gimbal 12 relative to the roll axis. In the normal circumstance, the motor-clutch unit 56 and the balance weight 63A operate so as to compensate for any torques operative on the gimbal 12 about the roll axis and thereby prevent movement of the gimbal. However, in the event of severe torques that overpower the balancing system so as to permit movement of the gimbal 12 about the roll axis, an output signal will be provided from the direction reference source 220A through the amplifier 221A, the normally closed contacts 135 of the relay R145 and the drive amplifier 200A to the torque motor 32 for purposes of restoring the gimbal 12 to its proper position.

This torque balance and neutralizing action described herein relative to the roll axis gyro 31 also takes place in a somewhat similar manner relative to the pitch axis gyro 41 so that the platform is maintained stabilized to the frame of reference. This action continues with regards to the gyro 31 of the roll axis gyro arrangement 14 until the relay R145 is operated at time $t_3$, that is the initiation of the camera shutter-open interval. This action relative to the gyro 41 in the pitch axis gyro arrangement 15 continues until the timing generator 210 operates at time $t_1$ to provide a timing pulse and to initiate a photographic cycle.

Assuming that the timing signal generator 210 operates to institute a photographic cycle, at the time $t_1$, a positive going pulse as shown in Figure 7A is applied via the normally open contacts 121 to the transfer relay R117. Responsive to the timing pulse, the relay R117 is operated to close at contacts 118 a circuit extending from the battery through the winding of the start relay R110 to ground potential whereby the latter relay is operated. Upon operating, the relay R110 completes a circuit from battery potential via the contacts 111 and 133 for maintaining the relay R110 operated and interrupts at contacts 114 the circuit for maintaining the relay R120 operated. Accordingly, R120 restores, opening contacts 122 and 123 thereby disconnecting the position detector 60B from the circuit to prevent operation of the balance-weight arrangement 63B. At the same time, a circuit is completed from positive potential through the normally closed contacts 133 and contacts 112 to the drive amplifier 170B, which amplifier then applies an output via contacts 132 to the integrator circuit 180 and via the contacts 147 to the drive amplifier 190B. The positive polarity pulses voltage applied to the drive amplifier 190B, as shown in Figure 7B, is applied to the motor-clutch unit 54 for driving the outer gimbal ring 10 from position $P_1$ towards position $P_2$ in the image-motion-compensation path. The positive voltage applied to the integrator 180 is integrated as shown in Figure 7C and applied through the drive amplifier 200B to the torque motor 42. At this time the velocity to the gimbal 10 in response to energization of the torque motor 42 and the motor-clutch 54 is as shown in Figure 7E.

The basic equations describing the dynamic behavior of a gyroscope demonstrate that the torque generated by motor clutch 54 must be the time-rate-of-change of the torque generated by torque motor 42. These equations further indicate that, if this relationship does not exist, oscillations of gyroscope 41 will develop. As a practical matter, integrating the input to motor-clutch 54 and employing the result as the input to torque motor 42 minimizes oscillations of gyroscope 41. Thus, the employment of integrator 180, arranged as shown and described, substantially achieves the conditions required by the governing equations.

As the output of the integrator 180 increases and develops an output substantially equal to the $v/h$ voltage, that is, the voltage at which the torque motor 42 is energized sufficiently to maintain the platform rate of motion required for image-motion-compensation independent of the motor-clutch 54, the trigger circuit 230 fires as shown in Figure 7F and energizes the tracking relay R130 via contacts 113 to ground. Upon operating, relay R130 closes at its contacts 131 a circuit extending via contacts 153 to positive battery potential whereby the relay R130 is maintained operated. Additionally, the relay R130 opens at contacts 133 the circuit for maintaining the start relay R110 operated so that the latter relay is restored, and opens at contacts 132 the circuit connecting the drive amplifier 170B to the integrator 180. Additionally, contacts 137 and 138 are closed for applying to the integrator unit 180 proper energy for maintaining the output of the integrator unit 180 constant and equal to the $v/h$ voltage as shown in Figure 7C.

Accordingly, at the time $t_2$ when the platform is at position $P_2$ in the compensation path, the controller 100 is operated so that the torque motor 42 is energized at a constant rate from the drive amplifier 200B for purposes of preserving the image-motion-compensation rate of the camera platform about the pitch axis 18. The motor-clutch unit 54, is at the same time, energized in accordance with signals fed thereto from the acceleration detector 59B.

Because of such practical considerations as the less-than-perfect efficiency of motor-clutch units 54 and 56, it is impossible to relate precisely the torques applied by the motor-clutches and the torque motors 32 and 42. As a result of this lack of precise relationship, oscillations of gyroscopes 31 and 41 may be excited. In order to minimize these oscillations, damping torques are provided by the motor clutches according to signals received from the acceleration detectors 59A and 59B, respectively, which detectors serve to sense the undesirable oscillations.

The directional reference source 220B provides an output signal corresponding to the position of the camera 13 about the pitch axis 18 as shown in Figure 7G wherein the polarity corresponds to the slope of the photographic axis relative to vertical and the magnitude corresponds to the amount of slope. When the camera 13 reaches a given forward angle at position $P_3$ in the image-motion-compensation cycle, where the output signal of the directional reference as shown in Figure 7G equals approximately one-half the product of the directional reference voltage $E_{v/h}$ and the selected exposure time voltage $E_e$ from the potentiometer 241, the trigger circuit 260 fires as shown in Figure 7H so as to energize and operate the shutter open relay R145. This occurs at time $t_3$.

Upon operating, the relay R145 closes at contacts 149 a circuit including the contacts 151 for maintaining the shutter open relay operated. At the same time contacts 146 are closed thereby completing from positive battery potential and via contacts 149 a circuit for operating the camera 13. A suitable pulse-shaping network responsive to positive battery potential may be included in the camera 13 for opening the shutter thereof in order to take a picture. At the same time, contacts 124, 125, 135, 148 and 147 are opened. Opening of the contacts 124 de-energizes the reversible motor 62A, opening of the contacts 125 and 148 completely de-energizes the motor-clutch unit 56 and opening of the contacts 135 de-energizes the torque motor 32, whereby all of the drive equipment associated with the roll axis gimbal ring 12 is rendered inoperative. Opening of the contacts 147 completely de-energizes the motor clutch unit 54 associated with the gimbal ring 10. Thus at the time $t_3$, only the torque motor unit 42 associated with the pitch axis gyro arrangement 15 is active and provides image-motion-compensation movement of the camera platform. Such provision insures proper constant angular movement of the platform during the picture taking interval.

As the platform continues through the constant angular rate portion of its cycle, the optical axis of the camera 13 eventually takes rearward angular position $P_4$ corresponding in angular displacement from the vertical to the forward angular position $P_3$. This rearward angular position $P_4$ is recognized at the trigger circuit 255 by the magnitude and polarity of the voltage applied thereto from the directional reference 220B as shown in Figure 7G. There upon the trigger circuit 255 fires at the time $t_4$ as shown in Figure 7J and applies to the shutter closed relay R150 a signal for operating the latter relay.

Upon operating, the relay R150 closes at contacts 155 a circuit including contacts 162 for maintaining the relay R150 operated. At the same time contacts 151 and 153 are opened thereby interrupting the circuits for maintaining the shutter open relay R145 and the tracking relay R130 operated, whereby these relays restore. The effect of the restoration of these relays is to interrupt at contacts 137 and 138 the circuits which have provided to the integrator unit 180 the power for energizing the torque motor 42 to drive the platform at a constant rate. Additionally, these relays recomplete at contacts 132 and 147 the circuits whereby the motor-clutch unit 54 and the torque motor 42 are energizable for purposes of reversing platform movement. Further, the circuit for maintaining the solenoid 270 operated is interrupted at contacts 140 thereby permitting the limit stop control 58 to participate in controlling the reversing platform movement. Additionally, restoration of the relay R145 closes contacts 124, 125, 148 and 135 thereby re-establishing operation of the roll axis stabilization equipment previously interrupted at time $t_3$.

Operation of the shutter closed relay R150 closes at contacts 154 a circuit for providing reverse energization to the drive amplifier 170B, thereby to reverse the action of the motor-clutch unit 54 and to depreciate the driving torque supplied by the torque motor 42; contacts 156 are closed for preparing a circuit to operate the trigger circuit 235, and contacts 157 are closed thereby to energize the solenoid 265 associated with the limit stop control 58.

Thus at position $P_4$ and at time $t_4$, the motor-clutch unit 56, the balance-weight 63A and the torque motor 32 associated with the roll axis gyro arrangement 14 are effective for stabilizing the camera platform about the roll axis. Additionally, the motor-clutch unit 54 and the torque motor 42 associated with the pitch axis gyro arrangement 15 are effective for controlling motion of the platform and are energized so as to decelerate the movement of the platform.

Referring to Figure 5, when solenoid 265 is energized at time $t_4$, the arm 313 in the limit stop control 58 is drawn in until the mechanical stop 319 thereof engages the solenoid unit. As the arm 313 is drawn in, the arm 311 controlled thereby is moved into an upright position corresponding to the reference position that the gyro apparatus 41 assumes when the platform is in the forward angular position $P_1$ and the switch 316 carried thereon is moved in a path to make contact with the arm 310.

Actually this contact between the arms 310 and 311 will occur not later than time $t_5$ when the platform is in position $P_5$. To damp any nutations that may arise in the gyro 41 as a result of such contact, a dashpot 320, of any suitable type, is included in series with the arm 313. When sufficient contact pressure has been built up between the arms 310 and 311, the leaf spring contact 317 of the switch 316 will be deflected into electrical engagement with the coil spring contact 318 thereby closing switch 316. This occurs at approximately time $t_5$ or when the platform movement is reversed from position $P_5$ towards position $P_7$.

While the solenoid 265 is being operated to draw in the arm 313 and rotate the arm 311, the motor-clutch unit 54 and the torque motor 42 are being reversibly driven so as to decelerate the platform and the outer gimbal ring 10 and to bring motion thereof to a halt. When the platform reaches position P₅ at the time t₅, motion of the platform has stopped and the platform is ready to be rotated back towards its starting position P₁. When the output of the integrator 180 becomes zero, the diode 181 associated therewith prevents the output thereof from going negative and reversing the motion of the torque motor 42. At this time the reversing motion or return of the platform from position P₅ to P₇ (or P₁) is achieved through operation of the motor-clutch unit 54 and limit stop control 58, the limit stop control being substituted for the torque motor in order to insure the desired rapid return of the platform to its position P₇.

When in the course of the platform's returning to its starting position, the optical axis of the camera 13 passes through vertical position P₆ as at time t₆, the output of the directional reference source 220B is zero volts which output is recognized by the trigger circuit 235. Thereupon trigger circuit 235 fires and applies its output as shown in Figure 7K to the return relay R160. The latter relay then operates to interrupt at contacts 162 the circuit for maintaining the shutter close relay R150 operated. Accordingly, the relay R150 restores, and contacts 154 are opened for removing from the drive amplifier 170B the reversing current applied to the motor-clutch unit 54. At the same time, the relay R160 closes contacts 165 for applying to the drive amplifier 170B a positive current which drives the motor-clutch unit 54 for decelerating the reversing motion of the platform. Additionally, contacts 163 are closed for shorting the integrator 180 and thus maintaining the output thereof at zero volts, and contacts 167 are closed for maintaining the solenoid relay 265 of the limit stop control 58 operated.

Closure of the switch 316 in the limit stop control 58 maintains the relay R160 operated via contacts 161. When velocity of the platform is diminished to a point so as to relieve any substantial pressure between the arms 310 and 311 in the limit stop control 58, the switch 316 thereof is opened and the return relay R160 is restored thereby completing at contacts 164 a circuit for operating the restabilization relay R120. The leaf spring contact 317 and the coil spring contact 318 cooperate to open the switch 316 just prior to the complete removal of contact pressure between the arms 310 and 311. At this time t₇, one cycle of operation of the platform has been completed and the arrangement is prepared to operate through another cycle responsive to a timing signal from the timing signal generator 210. Additionally, the relay R120 closes the contacts 127 for completing a circuit from the differential amplifier 250 to the drive amplifier 200B extending to the torque motor 42, thereby to adjust the platform starting position to accommodate the rate of image-motion-compensation required by the effective $v/h$ signal occurrent in the circuit at that instant.

Specifically, the output of the differential amplifier 250 is determined in accordance with the $v/h$ signal applied to a non-linear network 240 which is arranged to supply an output substantially proportional to the square of its input. The output of the non-linear network 240 is applied with an exposure time voltage derived from the potentiometer 241 to an amplifier stage 245 wherein the two voltages are added to provide one input to the differential amplifier 250. The second input to the amplifier 250 is from the directional reference source 220B as passed by amplifier 221B. The output from the amplifier 250 is applied to the drive amplifier 200B and the torque motor 42 is operated therefrom to adjust the position of the platform according to the required image-motion-compensation position determined by the velocity and terrain clearance of the aircraft and the exposure time for the film. Additionally, at this time the solenoid 270 in the limit stop control 58 is operated thereby to withdraw the switch 316 from proximity with the arm 310 and prevent closure of the switch.

In view of the foregoing description, there has been provided herewith a new and improved image-motion-compensation system for an aerial camera platform. In the arrangement of the invention, the camera platform is normally stabilized about a selected plane and responsive to the initiation of a photographic cycle, the camera platform is rotated about the pitch axis of the aircraft for purposes of permitting the camera to track the object to be photographed. Though the arrangement presented herein is at present considered to be preferred, it is to be understood that variations and modifications may be made therein and it is intended to cover in the appended claims all such modifications as fall within the true spirit and scope of the invention.

What is claimed is:

1. A position control system for a platform comprising means supporting said platform for rotation about an axis, reversible drive means responsive to control signals for applying rotational torques to said platform, sensing means responsive to rotational movements of said platform about said axis for producing signals in accordance with said movements, computer means providing a sequence of signals for operating said drive means so as to reversibly rotate said platform in a cycle through an arcuate path, and control means normally responsive to signals from said sensing means for applying corresponding control signals to said drive means and responsive to a sequence of signals from said computer means for blocking the signals from said sensing means and for applying corresponding control signals to said drive means, whereby said platform normally is stabilized to a plane including said axis and during the period of said sequence of signals from said computer means is reversibly rotated about said axis.

2. A position control system for a platform comprising means supporting said platform for rotation about an axis, reversible drive means responsive to control signals for applying rotational torques to said platform, gyroscopic apparatus supported on said platform for precessional movement with rotational movement of said platform about said axis, detector means responsive to precessional movements of said gyroscope for producing signals in accordance with said movements, computer means providing a sequence of signals for operating said drive means so as to reversibly rotate said platform in a cycle through an arcuate path, and control means normally responsive to signals from said detector means for applying corresponding control signals to said drive means and responsive to a sequence of signals from said computer means for blocking the signals from said detector means and for applying corresponding control signals to said drive means, whereby said platform normally is stabilized to a plane including said axis and during the period of said sequence of signals from said computer means is reversibly rotated about said axis.

3. A position control system for a platform comprising means supporting said platform for rotation about an axis, gyroscopic apparatus supported on said platform for precessional movement with rotational movement of said platform about said axis, wherein said precessional movement and said rotational movement are mutually and antireciprocally related, reversible drive means responsive to control signals for applying rotational torques to said platform and for applying precessional torques to said gyroscopic apparatus, detector means responsive to precessional movements of said gyroscope for producing signals in accordance with said movements, computer means providing a sequence of signals for operating said drive means so as to reversibly rotate said platform in a cycle through an arcuate path, and control means normally responsive to signals from said detector means for applying corresponding control signals to said drive means and responsive to a sequence of signals from said computer means for blocking the signals from said detector means and for applying corresponding control signals to said drive means, whereby said platform normally is stabilized to a plane including said axis and during the period of said sequence of signals from said computer means is reversibly rotated about said axis.

4. A position control system for a platform comprising means supporting said platform for rotation about an axis, gyroscopic apparatus supported on said platform with the input axis and the output axis of said apparatus in the plane of said platform respectively perpendicular to and parallel to said platform axis, first torquing means for applying torque about the output axis of said gyroscopic apparatus, second torquing means for applying torques about the input axis of said gyroscopic apparatus, detector means responsive to precessional movement of said gyroscopic apparatus for producing signals in accordance with said movements, computer means for providing a sequence of signals for operating said first and second torquing means to reversibly rotate said platform in a cycle through an arcuate path, and control means normally responsive to signals from said detector means for applying corresponding signals to said first and second torquing means and responsive to a sequence of signals from said computer means for blocking signals from said detector means and for applying signals corresponding to said computer signals to said first and second torquing means, whereby said platform normally is stabilized to the plane of said input and output axes and during the period of said sequence of signals is reversibly rotated about said axis.

5. A position control system for a platform comprising means supporting said platform for rotation about an axis, gyroscopic apparatus supported on said platform with the input axis and the output axis of said apparatus in the plane of said platform respectively perpendicular to and parallel to said rotational axis, first torquing means for applying torques to the platform about its rotational axis, second torquing means for applying torques to said gyroscopic apparatus about said input axis, detector means responsive to precessional movements of said gyroscopic apparatus for producing signals in accordance with said movements, computer means for providing a sequence of signals for operating said first and second torquing means to reversibly rotate said platform in a cycle through an arcuate path, and control means normally responsive to signals from said detector means for applying corresponding signals to said first and second torquing means and responsive to a sequence of signals from said computer means for blocking signals from said detector means and for applying signals corresponding to said computer signals to said first and second torquing means, whereby said platform normally is stabilized to the plane of said input and output axes of said gyroscopic apparatus and during the period of said sequence of signals said platform is reversibly rotated about said platform axis.

6. The position control system set forth in claim 4 wherein the signal applied to said first torquing means by said control means is the time-rate-of-change of the signal applied to said second torquing means.

7. A position control system for a platform comprising means supporting said platform for rotation about an axis, gyroscopic apparatus supported on said platform with the input axis and the output axis of said gyroscopic apparatus in the plane of said platform respectively perpendicular to and parallel to said rotational axis, first torquing means for applying torques to the platform about its rotational axis, second torquing means for applying torques to said gyroscopic apparatus about said input axis, detector means responsive to precessional movements of said gyroscopic apparatus for producing signals in accordance with said movements, computer means for providing a sequence of signals for operating said first and second torquing means to reversibly rotate said platform in a cycle through an arcuate path, and control means normally responsive to signals from said detector means for applying corresponding signals to said first and second torquing means and responsive to a sequence of signals from said computer means for blocking signals from said detector means and for applying signals corresponding to said computer signals to said first and second torquing means, said control means including first signal means for applying first control signals to said first torquing device and second signal means for applying second control signals to said second torquing device wherein said first control signals are a time-rate-of change function of said second control signals, whereby said platform normally is stabilized to the plane of said input and output axes of said gyroscopic apparatus and during the period of said sequence of signals said platform is reversibly rotated about said platform axis.

8. The position control system set forth in claim 7 wherein said first signal means is an amplifier and said second signal means is an integrator connected in series with said amplifier.

9. A position control system for a platform comprising means supporting said platform for rotation about an axis, gyroscopic apparatus supported on said platform with the input axis and the output axis of said gyroscopic apparatus in the plane of said platform respectively perpendicular to and parallel to said rotational axis, first torquing means for applying torques to the platform about its rotational axis, second torquing means for applying torques to said gyroscopic apparatus about said input axis, third torquing means for applying torques to the platform about its rotational axis, position detector means responsive to precessional movements of said gyroscopic apparatus for providing first direction signals of amplitudes and of polarities in accordance with the position attained due to precessional movements, acceleration detector means responsive to precessional movements of said gyroscope for providing second direction signals of amplitudes corresponding to the rate of change of movement, computer means for providing a sequence of third direction signals for operating said torquing means to reversibly rotate said platform in a cycle through an arcuate path, and control means normally applying said first direction signals to said third torque means and mixing and applying said first and second direction signals to said first torque means and being responsive to said third direction signals for disassociating said position detector and said acceleration detector from said control means and for applying said third direction signals to said first torque means and to said second torque means.

10. In a position control system provided with a platform and means for supporting said platform for rotation about an axis, a stabilization system comprising gyroscopic apparatus supported on said platform with the input axis and the output axis of said gyroscopic apparatus in the plane of said platform respectively perpendicular to and parallel to said rotational axis, first torquing means for applying torques about the output axis of said gyroscopic apparatus, second torquing means for applying torques about the input axis of said gyroscopic apparatus, third torquing means for applying torques to the platform about its rotational axis, gyro position detector means responsive to precessional movements of said gyroscopic apparatus for providing first direction signals of amplitudes and of polarities in accordance with the position due to precessional movements, acceleration detector means responsive to precessional movements of said gyroscope for providing second direction signals of amplitudes corresponding to the rate of change of movement, platform position detector means responsive to inclinations of said platform about said rotational axis for providing third direction signals of amplitudes and of polarities in accordance respectively with the magnitude and with the direction of platform inclination, and control means for applying said first direction signals to said third torque means and for mixing and applying said first and second direction signals to said first torque means, and for applying said third direction signals to said second torque means.

11. In a position control system provided with a platform and means for supporting said platform for rotation about an axis, a stabilization system comprising gyroscopic apparatus supported on said platform with the input axis and the output axis of said gyroscopic apparatus in the plane of said platform respectively perpendicular to and parallel to said rotational axis, first torquing means for applying torques to said platform about the output axis of said gyroscopic apparatus, second torquing means for applying torques about the input axis of said gyroscopic apparatus, third torquing means for applying torques to the platform about its rotational axis, gyro position detector means responsive to precessional movement of said gyroscopic apparatus for providing first direction signals of amplitudes and of polarities in accordance with the position attained due to precessional movements, acceleration detector means responsive to precessional movements of said gyroscope for providing second direction signals of amplitudes corresponding to the rate of change of movement, platform position detector means responsive to inclination of said platform about said rotational axis for providing third direction signals of amplitudes and polarities in accordance respectively with the magnitude and with the direction of platform inclination, a first amplifier for applying the output of said gyro position detector to said third torque means, a second amplifier for receiving the output of said acceleration detector, a third amplifier for applying jointly the output of said position detector and the output of said second amplifier to said first torque means, and a fourth amplifier for applying the output of said platform position detector to said second torque means.

12. A position control system for an aerial camera platform comprising airborne means supporting said platform for rotation about an axis, gyroscopic apparatus supported on said platform with the input axis and the output axis of the gyroscopic apparatus in the plane of said platform respectively perpendicular to and parallel to said rotational axis, first torquing means for applying torques to said platform about the output axis of said gyroscopic apparatus, second torquing means for applying torques about the input axis of said gyroscopic apparatus, third torquing means for applying torques to the platform about its rotational axis, gyro position detector means responsive to precessions of said gyroscope for providing first direction signals of amplitudes and of polarities in accordance respectively with the magnitudes and with the directions of precessional movements, acceleration detector means responsive to precessional movements of said gyroscope for providing second direction signals of amplitudes corresponding to the rate of change of precession, platform position detector means responsive to inclinations of said platform about said rotational axis for providing third direction signals of amplitudes and of polarities in accordance respectively with the magnitude and with the direction of platform inclination, a first amplifier for applying the output of said gyro position detector to said third torque means, a second amplifier for receiving the output of said acceleration detector, a third amplifier for applying jointly the output of said gyro position detector and the output of said second amplifier to said first torque means, a fourth amplifier for normally supplying the output of said platform position detector to said second torque means, an integrator unit for receiving the output of said second amplifier, a source of positive potential, a source of negative potential, a source of variable potential, and relay means operative selectively for disconnecting said gyro position detector from said third amplifier and disconnecting said first amplifier from said third torque means and disconnecting said second amplifier from said integrator and disconnecting said platform position detector from said fourth amplifier and for selectively connecting said source of positive potential and said source of negative potential to said second amplifier and to said integrator and connecting said source of variable potential to said integrator and connecting said integrator to said fourth amplifier in order to reversibly drive said platform in an arcuate path about its axis.

13. The position control system set forth in claim 12 wherein the voltage of said source of variable potential is in accordance with the terrain clearance and velocity of the airborne means relative to the object to be photographed.

14. A position control system for an aerial camera platform comprising airborne means for supporting said platform for rotation about an axis, gyroscopic apparatus supported on said platform with the input axis and the output axis of said apparatus in the plane of said platform respectively perpendicular to and parallel to said rotation axis, first torque means for applying torques about the output axis of said gyroscopic apparatus, second torque means for applying torques about the input axis of said gyroscopic apparatus, third torque means for applying torques to the platform about its rotational axis, gyro position detector means responsive to precessional movement of said gyroscope for providing first direction signals of amplitudes and of polarities in accordance with the position attained due to precessional movements, acceleration detector means responsive to precessional movements of said gyroscope for providing second direction signals of amplitudes corresponding to the rate of change of movements, platform position detector means responsive to inclinations of said platform about said rotational axis for providing third direction signals of amplitudes and of polarities in accordance respectively with the magnitudes and with the direction of platform inclination, a first amplifier for applying the output of said position detector to said third torque means, a second amplifier for receiving the output of said acceleration detector, a third amplifier for applying jointly the output of said position detector and the output of said second amplifier to said first torque means, a fourth amplifier for normally supplying the output of said platform position detector to said second torque means, a normally deactivated integrator unit when activated receiving the output of said second amplifier and applying the integrated signal output thereof to said fourth amplifier, a source of positive potential, a source of negative potential, a source of variable potential, a normally operative first relay when restored disconnecting said position detector and said first amplifier respectively from said third amplifier and from said third torque means and activating said integrator, a start relay selectively operated for restoring said first relay and for connecting said source of positive potential to said second amplifier thereby to cause said platform to be driven about its axis from a start position, a second relay operated from said integrator responsive to a predetermined output voltage for restoring said start relay and for maintaining said first relay restored and for disconnecting said second amplifier from said integrator and for connecting said source of negative potential and said source of variable potential to said integrator thereby to continue movement of said platform about said axis, a third relay operative responsive to said platform reaching a first predetermined position in its path of movement for disconnecting said second amplifier from said third amplifier, a fourth relay operative responsive to said platform reaching a second predetermined position in its path of movement for restoring said second and third relays and for maintaining said first relay restored and for connecting said source of negative potential to said second amplifier in order to decelerate and reverse the movement of the platform, a fifth relay operative upon the platform reaching a third predetermined position in its path of reverse movement for restoring said fourth relay and for maintaining said first relay restored and for applying said source of positive potential to said second amplifier whereby said platform is decelerated to its start position, and means responsive to said platform reaching said start position for restoring said fifth relay thereby to reoperate said first relay.

15. A position control system for an aerial camera platform comprising airborne means for supporting said platform for rotation about an axis, gyroscopic apparatus supported on said platform with the input axis and the output axis of said apparatus in the plane of said platform respectively perpendicular to and parallel to said rotational axis, first torquing means for applying torques about the output axis of said gyroscopic apparatus, second torquing means for applying torques about the input axis of said gyroscopic apparatus, third torquing means for applying torques to the platform about its rotational axis, gyro position detector means responsive to precessional movement of said gyroscope for providing first direction signals of amplitudes and of polarities in accordance with the position attained due to precessional movements, acceleration detector means responsive to precessional movements of said gyroscope for providing second direction signals of amplitudes corresponding to the rate of change of movement, platform position detector means responsive to inclinations of said platform about said rotational axis for providing third direction signals of amplitudes and of polarities in accordance respectively with the magnitude and with the direction of platform inclination, a first amplifier for applying the output of said position detector to said third torque means, a second amplifier for receiving the output of said acceleration detector, a third amplifier for applying jointly the output of said position detector and the output of said second amplifier to said first torque means, a fourth amplifier for normally supplying the output of said platform position detector to said second torque means, a normally deactivated integrator unit when activated receiving the output of said second amplifier and applying the integrated signal output thereof to said fourth amplifier, a source of positive potential, a source of negative potential, a source of variable potential providing an output voltage in accordance with the terrain clearance and velocity of said airborne means relative to the object to be photographed, a normally operative first relay when restored disconnecting said position detector and said first amplifier respectively from said third amplifier and from said third torque means and activating said integrator, a start relay selectively operated for restoring said first relay and for connecting said source of positive potential to said second amplifier thereby to cause said platform to be driven about its axis from a start position, a second relay operated from said integrator responsive to a predetermined output voltage for restoring said start relay and for maintaining said first relay restored and for disconnecting said second amplifier from said integrator and for connecting said source of negative potential and said source of variable potential to said integrator thereby to continue movement of said platform about said axis, a third relay operative responsive to said platform reaching a first predetermined position in its path of movement for disconnecting said second amplifier from said third amplifier, gyroscope limit stop apparatus, a fourth relay operative responsive to the platform reaching a second predetermined position in its path of movement for restoring said second and third relays and for maintaining said first relay restored and for connecting said source of negative potential to said second amplifier and for operating said gyroscope limit stop apparatus in order to decelerate and reverse movement of the platform, a fifth relay operative upon the platform reaching a third predetermined position in its path of return movement for restoring said fourth relay and for maintaining said first relay restored and for applying said source of positive potential to said second amplifier whereby said platform is decelerated to its start position, and means responsive to said platform reaching said start position for restoring said fifth relay and reoperating said first relay.

16. A position control system for an aerial camera platform mounted for rotation about a first axis and about a second axis at right angles to one another in the plane of said platform; means for reversibly driving the platform in an arcuate path about the first axis thereof, thereby to provide image-motion-compensation to the photographic film thereof; and means for stabilizing said platform about said second axis comprising gyroscopic apparatus supported on said platform with the input and the output axis of said apparatus in the plane of said platform respectively perpendicular to and parallel to said second axis, torque means for applying torques to said platform about said second axis, a gyro position detector responsive to rotational movements of said gyroscope about the output axis thereof for producing corresponding signals, a platform position detector responsive to inclination of said platform about said first axis for producing corresponding signals, and means for applying the difference between the signal from said gyro position detector and said platform position detector to said torque means, whereby disturbing torques about said second axis are detected by said gyroscopic apparatus and said gyro position detector to operate said torque means for stabilizing said platform about said second axis, and whereby when said platform is driven through said arcuate path about said first axis, thereby causing said gyro arrangement to rotate about its output axis, the signal developed in said gyro position detector means is compensated by the signal developed in said platform position detector.

17. A position control system for an aerial camera platform mounted for rotation about a first axis and about a second axis at right angles to one another in the plane of said platform; means for reversibly driving the platform in an arcuate path about the first axis thereof, thereby to provide image-motion-compensation to the photographic film thereof; and means for stabilizing said platform about said second axis comprising gyroscopic apparatus supported on said platform with the input axis and the output axis of sa'd apparatus in the plane of said platform respectively perpendicular to and parallel to said second axis, torque means for applying torques to said platform about said second axis, a gyro position detector responsive to rotational movements of said gyroscope about the output axis thereof for producing corresponding signals, a platform position detector responsive to inclination of said platform about said first axis for producing corresponding signals, a differential amplifier provided with signals from both sa'd gyro position detector and said platform position detector for producing an output signal corresponding to the difference signal therebetween, and means for applying the output signal from said difference amplifier to said torque means, whereby when said platform is dr'ven through said arcuate path about said first axis thereby causing said gyro arrangement to rotate about its output axis, the signal developed in the gyro position detector is compensated in said difference amplifier by the signal developed in sa'd platform position detector.

18. A position control system for an aerial camera platform mounted for rotation about a first axis and about a second axis at right angles to one another in the plane of said platform; means for reversibly driving the platform in an arcuate path about the first axis thereof, thereby to provide image-motion-compensation to the photographic film thereof; and means for stabilizing said platform about said second axis comprising gyroscopic apparatus supported on said platform with the input axis and the output axis of said apparatus in the plane of said platform respectively perpendicular to and parallel to said second axis, first torque means for applying torques to said platform about said second axis, second torque means for applying torques to said gyroscopic apparatus about the output axis thereof, a gyro position detector responsive to rotational movements of said gyroscope about the output axis for producing corresponding signals, first platform position detector means responsive to inclination of said platform about said first axis for producing corresponding signals, a differential amplifier provided with input signals from both said gyro position detector and said first platform position detector for producing an output signal corresponding to the difference signal therebetween, means for applying the output signal from said difference amplifier to said first torque means, and second platform position detector means responsive to inclination of said platform about said second axis for producing corresponding signals and for applying said signals to said second torque means, whereby disturbing torques about said second axis are detected by said gyroscopic apparatus and said gyro position detector for operating said first torque means through said differential amplifier and are detected by said second platform position detector for operating said second torque means to stabilize said platform about said second axis, and whereby when said platform is driven through said arcuate path about said first axis thereby causing said gyro arrangement to rotate about its output axis, the signal developed in said gyro position detector is compensated in said difference amplifier by the signal developed in said first platform position detector.

References Cited in the file of this patent

UNITED STATES PATENTS

| | | |
|---|---|---|
| 1,645,079 | Titterington | Oct. 11, 1927 |
| 1,829,142 | Hyden | Oct. 27, 1931 |
| 2,507,459 | Sandvik et al. | May 9, 1950 |
| 2,899,882 | Wylie et al. | Aug. 18, 1959 |